United States Patent [19]

Jellinek

[11] 4,107,689
[45] Aug. 15, 1978

[54] SYSTEM FOR AUTOMATIC VEHICLE LOCATION
[75] Inventor: Ernest Jellinek, Haddonfield, N.J.
[73] Assignee: RCA Corporation, New York, N.Y.
[21] Appl. No.: 694,042
[22] Filed: Jun. 7, 1976
[51] Int. Cl.² .............................................. G01S 3/02
[52] U.S. Cl. .............................. 343/112 TC; 340/24; 364/450
[58] Field of Search ............. 340/23, 24; 343/6.5 LC, 343/112 TC; 325/53; 235/150.24

[56] References Cited
U.S. PATENT DOCUMENTS

| | | | |
|---|---|---|---|
| 2,939,135 | 5/1960 | Beckerich et al. | 343/112 |
| 3,715,572 | 2/1973 | Bennett | 235/150.24 |
| 3,886,515 | 5/1975 | Cottin et al. | 340/23 |
| 3,899,671 | 10/1975 | Stover | 235/150.24 |
| 3,947,807 | 3/1976 | Tyler et al. | 340/23 |
| 3,961,166 | 6/1976 | Stobant | 340/24 |
| 3,984,806 | 10/1976 | Tyler | 340/23 |

Primary Examiner—Samuel W. Engle
Assistant Examiner—S. A. Cangialosi
Attorney, Agent, or Firm—H. Christoffersen; Joseph D. Lazar; John P. McMahon

[57] ABSTRACT

An automatic vehicle location system wherein the position of a mobile unit is at any time (on a "real-time" basis) defined by a stored predetermined location code communicated to the mobile unit from a remote unit at a predetermined location and dead reckoned location coordinates relative to such stored location. When the mobile unit passes into the vicinity of a different remote unit, a new predetermined location code is communicated to the mobile unit from such remote units, and the dead reckoned coordinates are reset to zero. A novel dead reckoning system for use in conjunction with a specific deployment of the remote units is also disclosed.

10 Claims, 4 Drawing Figures

SYSTEM FOR AUTOMATIC VEHICLE LOCATION

CROSS REFERENCE TO RELATED APPLICATIONS

Of interest are the following copending applications: Ser. No. 576,604, entitled "A Homodyne Communicating System" by G. S. Kaplan and A. D. Ritzie, filed May 12, 1975; Ser. No. 625,884, entitled "A Semipassive Responder Utilizing a Low Voltage, Low Power Drain Reflective Varactor Phase Modulator" by J. Rosen, filed Oct. 28, 1975; and Ser. No. 694,043 entitled "Heading Sensor for Vehicle Dead Reckoning System", by E. Jellinek, filed on June 7, 1976, now U.S. Pat. No. 4,055,750, all of which applications being assigned to the same assignee as that of this application.

BACKGROUND OF THE INVENTION

1. Field of the Invention

The present invention relates to automatic vehicle location systems, and in particular to dead reckoning vehicle location systems.

2. Description of the Prior Art

Automtic vehicle location (AVL) systems using dead reckoning for determination of vehicle locations are well known. In dead reckoning AVL systems, an initial position of the vehicle is determined and transmitted to a central station. Such initial position or "origin" determination is typically made manually or automatically by a signalling device located at a predetermined location which causes a code to be transmitted to the central station when the vehicle passes in the vicinity of the signalling device. The instantaneous location of the vehicle with respect to the initial position, or origin, is thereafter computed by utilizing directional changes and the distance traveled by the vehicle occurring between the time the vehicle passed the initial position and the time of measurement.

A problem which plagues dead reckoning systems is that distance and heading errors are typically cumulative. Thus, in order for a dead reckoning system to be accurate, the location information must be frequently corrected. Prior art systems have attempted to solve such a problem by maintaining in storage accurate location coordinates corresponding to known drivable surfaces within a predetermined coverage area and approximately correcting the vehicle's location in accordance with a comparison of dead reckoned locations to known locations of drivable surfaces. One such prior art system is described in U.S. Pat. No. 3,789,198, to Henson et al. issued Jan. 29, 1974. In the Henson et al. system each cooperating vehicle is repetitively interrogated at preset intervals, on the order of 5 milliseconds long, and the vehicle responds by communicating to a central station its heading, and the distance traversed since last interrogated. The calculation of dead reckoned position coordinates of the vehicle and the comparison of the dead reckoned coordinates to known coordinates are performed in a computer at the central station. Another such prior art system, developed by Marconi Research Laboratories, is described in U.S. Pat. No. 3,947,807 issued Mar. 30, 1976 to R. A. Tyler et al. and in "UK vehicle tracker is built around microprocessor", Electronics, Mar. 6, 1975, page 48. The Marconi AVM system utilizes a data processor and cooperating map storage means self contained within the vehicle for performing the comparison and correcting function. The Marconi system maintains in the map storage means the distances between all intersections of drivable surfaces within the coverage area, and all angles associated with each intersection as turned through from any possible direction. The dead reckoning system utilizes a turn sensor as opposed to a heading sensor, and the dead reckoned vehicle location is reset to the associated prestored value automatically at each turn. Such prior art systems, are disadvantageous in that large amounts of data storage are required and in that the data processor is relatively complex and expensive. The Henson et al. system is additionally disadvantageous in that it requires a very high rate (density) of communication between the vehicle and the central station to prevent the position error from becoming so large that it cannot be corrected properly.

Another description of the Henson et al. system sometimes known as the Boeing "Flair" System may be found in "A Boeing Plot to Find Squad Cars," Electronics, Feb. 21, 1974, page 30. A description of various prior art systems, including the Henson et al. and Marconi systems, mentioned above, may be found in "Decca to enter chancy vehicle location business", by Michael Payne, Electronics Weekly, Nov. 12, 1975, page 5.

Other prior art systems, as noted in the above mentioned U.S. Pat. No. 3,789,198, have attempted to solve the problem of cumulative errors by establishing a plurality of check points within the coverage area which cause the vehicle to communicate to the central station a predetermined location code as it passes the vicinity of the check point. Such systems are disadvantageous for use with a large number of vehicles in that, as a practical matter, the time of transmission of such predetermined location codes are not controllable and priority conflicts may arise between the respective vehicles. Further, a large amount of communication between the vehicles and the central station is required.

SUMMARY OF THE INVENTION

The present invention provides for an improvement in a system for monitoring the position of a vehicle within a predetermined area. Such a system comprises a first means within the vehicle to determine the instantaneous location coordinates of the vehicle with respect to an origin. A plurality of remote units are respectively positioned at predetermined locations within the area. Each remote unit communicates to the vehicle information indicative of its respective predetermined location as the vehicle passes such location. The improvement in the system comprises second means, in the vehicle, for receiving the communicated predetermined locations information and storing the last communicated predetermined location information and wherein further, the first means determines the instantaneous location coordinates with respect to the stored location.

DETAILED DESCRIPTION OF THE PREFERRED EMBODIMENT

Figure 1:
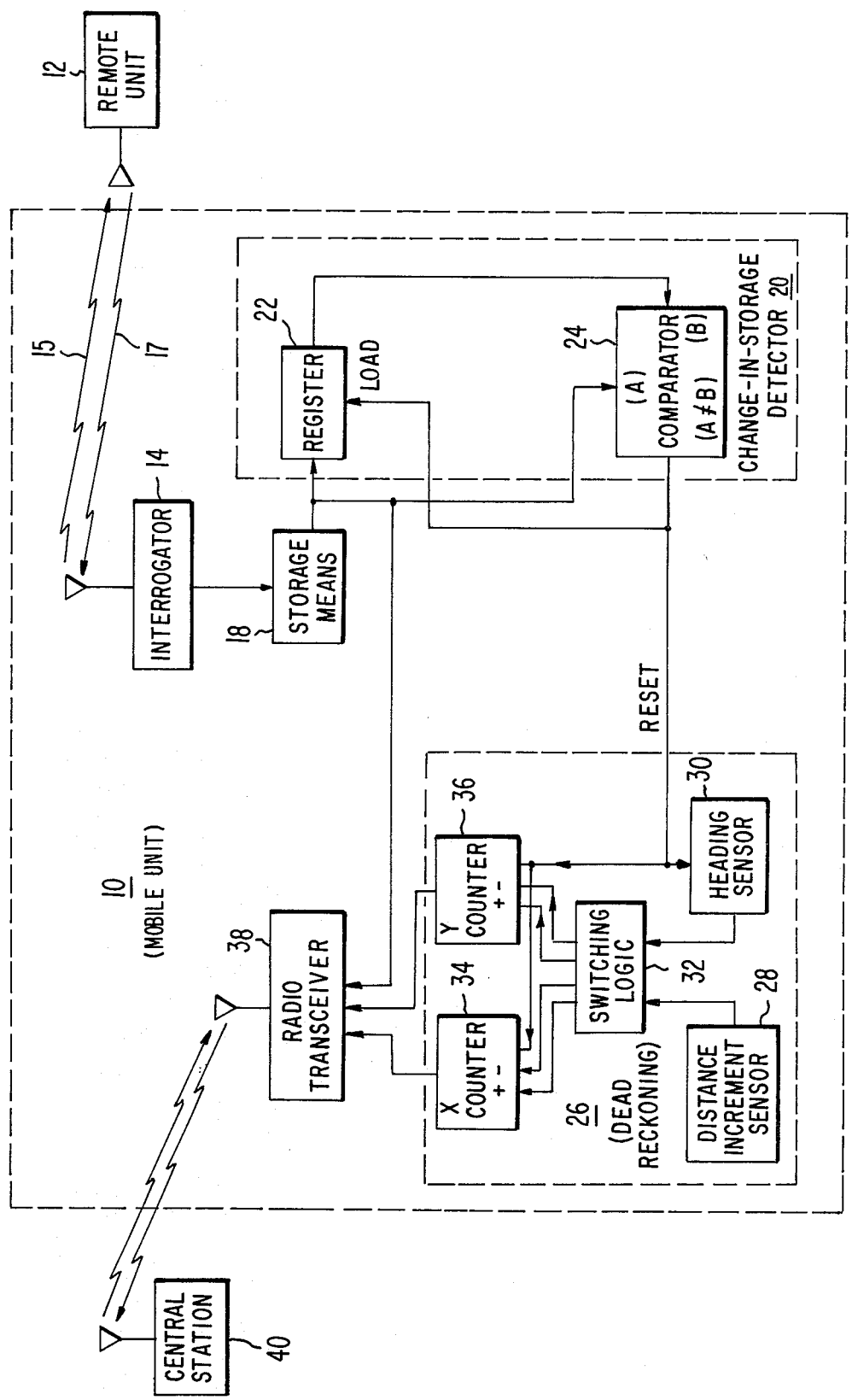
FIG. 1 is a block diagram of an embodiment of an automatic vehicle location system in accordance with the present invention.

Referring to FIG. 1, there is shown a mobile unit 10 coupled to a cooperating vehicle (not shown). Mobile unit 10 includes a suitable interrogator 14; suitable storage means 18, a change-in-storage detector 20; a resettable dead reckoning system 26; and a conventional radio transceiver 38. A remote unit 12 is deployed, for example as a signpost, at a predetermined roadside location within the coverage area of the automatic vehicle location (AVL) system. As will be explained, a plurality of such remote units are deployed throughout such coverage area.

Interrogator 14, directionally transmits a continuous wave signal 15 which serves as an interrogation signal to remote unit 12 when mobile unit 10 comes into the vicinity of remote unit 12. Remote unit 12, in response to signal 15, generates a modulated "return" or "reply" signal 17 which is radiated back to interrogator 14. Reply signal 17 is modulated in accordance with a code word indicative of the predetermined location (identity) of remote unit 12. Interrogator 14, in response to reply signal 17, generates an output signal indicative of the location of remote unit 12. For a description of suitable interrogators 14 and remote units 12 reference is made to the aforementioned copending applications Ser. No. 576,604 filed May 12, 1975 by G. S. Kaplan and A. D. Ritzie entitled "A Homodyne Communications Systems", now U.S. Pat. No. 3,984,835. It should be appreciated that constantly transmitting remote units such as described in U.S. Pat. No. 3,735,335, entitled "Electronic Fence Vehicle Locator Transmitter and System Using Same," issued May 22, 1973 to G. S. Kaplan and J. Shefer, may also be used. Constantly transmitting signposts would be used in conjunction with a receiver in mobile unit 10, such receiver replacing interrogator 14. A preferred embodiment of interrogator 14, including means to detect the direction of passage of mobile unit 10 with respect to remote unit 12, will be hereinafter described in conjunction with FIG. 4.

The output signals of interrogator 14 are applied to storage means 18 wherein they are temporarily stored. Storage means 18 suitably comprises a conventional register. The register may comprise a plurality of fields, to facilitate indication of the direction of travel of mobile unit 10 as it passes remote unit 12, as well as the location of remote unit 12, as will be explained in conjunction with FIG. 4. An alternative suitable storage means 18, wherein the storage means comprises a plurality of registers and the sequence of the contents thereof operates to indicate the direction of travel of mobile unit 10, is described in the aforementioned copending application Ser. No. 576,604 by Kaplan and Ritzie.

Storage means 18 is coupled to change-in-storage detector 20. In accordance with the present invention, change-in-storage detector 20 generates a signal to reset dead reckoning system 26 to zero, as will be explained, each time the contents of storage means 18 change. The contents of storage means 18 change, for example, when any of the following events occur: (1) when mobile unit 10 first passes a remote unit; (2) when mobile unit 10 passes a remote unit different from the last passed remote unit or (3) when mobile unit 10 passes the same remote unit from the opposite direction. Change-in-storage detector 20 suitably comprises a conventional storage register 22 and comparator 24. The instantaneous contents of storage means 18 are applied to both register 22 and comparator 24 (input A). Register 22 is not loaded, however, with the contents of storage means 18 except on command from comparator 24 as will be explained. Compartor 24 has applied thereto, in addition to the contents of storage means 18, the instantaneous contents of register 22, and operates to compare such contents. When the contents of storage means 18 change from a previous value, register 22 does not reflect such change but, rather, maintains the previous value. Thus, the contents of storage means 18 and register 22 become different and comparator 24 generates an output signal indicative of the occurrance of a change in the contents of storage means 18. Such change in storage signal is utilized as the load command signal to register 22, to ready register 22 for detection of the next "change in storage". The change in storage signal is also utilized to reset dead reckoning system 26 to zero, as will be explained.

Figure 2:
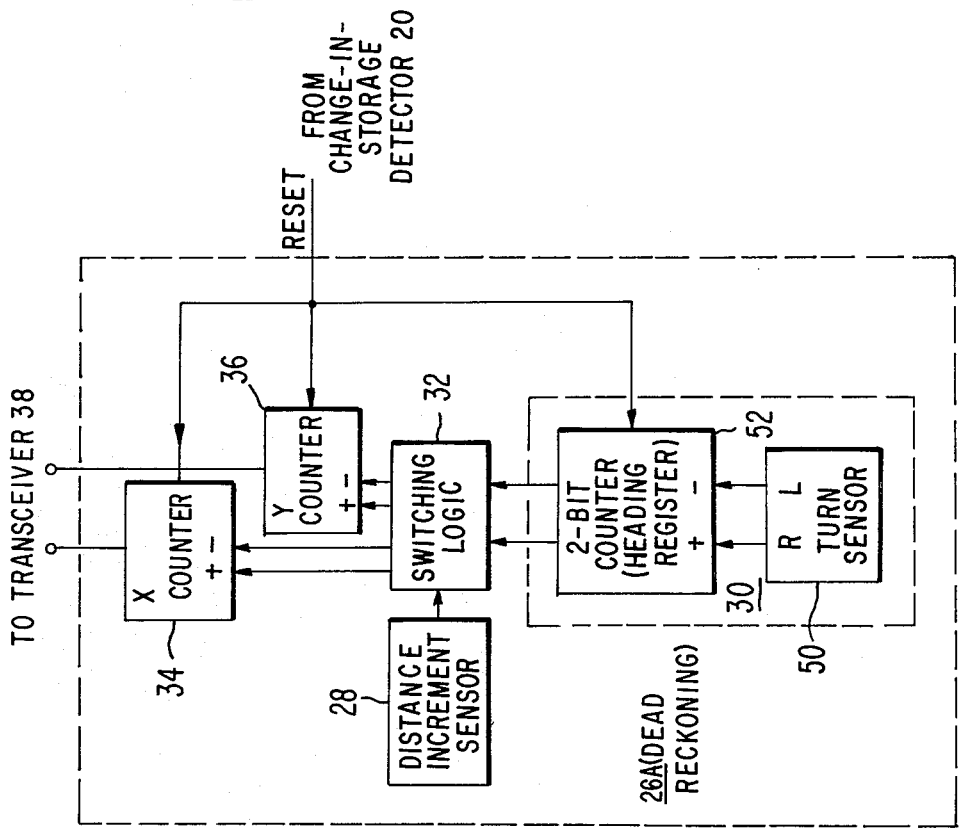
FIG. 2 is a block diagram of a preferred embodiment of a simplified dead reckoning system for use with a specific deployment of remote units.

Dead reckoning system 26 comprises: a conventional distance increment sensor 28, such as an odometer; a suitable heading sensor 30; suitable switching logic 32; and conventional bi-directional (up-down) counters 34 and 36 (hereinafter referred to as X-counter 34 and Y-counter 36). Heading sensor 30 generates a signal indicative of the angular heading of mobile unit 10 with respect to a reference direction by the direction of travel of mobile unit 10 when it passed remote unit 12. Heading sensor 30 may be of any known type, such as compass, inertial or two-odometer type heading sensors. It is preferable that heading sensor 30 produce a digital signal and, in addition, be resettable to facilitate changing of the reference direction. For a description of such a heading sensor, reference is made to aforementioned copending application Ser. No. 694,043 filed on June 7,1976. In addition, a preferred embodiment 26a of dead reckoning system 26 including a preferred form of heading sensor 30, for use in conjunction with a specific deployment of remote units is depicted in FIG. 2 and will be hereinafter described.

As will hereinafter be explained in more detail, switching logic 32 operates to route proportionally, pulses from distance increment sensor 28 to X and Y counters 34 and 36 respectively, in proportion to and in accordance with the cosine and sine of the heading angle represented by the output signal of heading sensor 30. Thus switching logic 32 converts the polar coordinates defined by the output of distance sensor 28 and heading sensor 30 into cartesian coordinates accumulated in counters 34 and 36. Switch logic 32 may comprise digital multipliers and look-up tables, such as ROMs, in a manner well known in the art. In accordance with one aspect of the present invention, heading sensor 30, and X and Y counters 34 and 36, are all reset to zero by the output signal of change-in-storage detector 20. Zero contents in both X and Y counters 34 and 36 thereafter corresponds to the location of mobile unit 10 when the counters are reset. Similarly, a "zero" output signal from heading sensor 30 thereafter corresponds to mobile unit 10 heading in the same direction that it was travelling when heading sensor 30 was reset to zero. Thus, the contents of X counter 34 and Y counter 36 are respectively representative of the X and Y cartesian coordinates of the instantaneous location of the mobile unit 10 on a coordinate system defined by the location and direction of travel of mobile unit 10 at the instant dead reckoning system 26 is reset to zero by change-in-storage detector 20.

In the operation of an AVL system in accordance with the present invention, when mobile unit 10 comes into the vicinity of remote unit 12, the following occur. The location code of remote unit 12 is communicated to mobile unit 10 and loaded into storage means 18. Storage means 18 also contains information indicative of the direction of travel of mobile unit 10 as it passes remote unit 12 (hereinafter "the original direction of passage"). The derivation of such original direction of passage information will hereinafter be described in conjunction with FIG. 4. The contents of storage means 18 are thus indicative of the location code (identity) of remote unit 12 and the original direction of passage of remote unit 10 with respect to such remote unit. If remote unit 12 is different from the last previously passed remote unit or if remote unit 12 is the last previously passed remote unit, but was previously passed from the opposite direction, change in storage detector 20 operates to reset dead reckoning system 26 to zero. The contents of storage means 18 thus identify the position and direction of travel of mobile unit 10 at the instant dead reckoning system 26 is reset. The contents of storage means 18 therefore define a rectangular (cartesian) coordinate system having an origin at the position of remote unit 12 and a positive Y axis in the original direction of passage of mobile unit 10 with respect to remote unit 12. The contents of counters 34 and 36 having each been reset to zero by remote unit 12 are thereafter indicative of the X and Y coordinates of the instantaneous location of mobile unit 10 on that coordinate system. When mobile unit 10 comes into the vicinity of a remote unit different from remote unit 12, or passes remote unit 12 from the opposite direction, the location code of the most recently passed remote unit and original direction of passage of mobile unit 10 with respect to such remote unit are loaded into storage means 18, and dead reckoning system 26 is again reset to zero. Thus, a new coordinate system is established, defined by the location of the most recently passed remote unit and the original direction of passage with respect to that remote unit. The instantaneous position of mobile unit 10 is therefore identified by the contents of counters 34 and 36 in conjunction with the contents of storage means 18. The contents of storage means 18 identify the present coordinate system, while the contents of X and Y counters 34 and 36 are indicative of the X and Y coordinates of the instantaneous location of mobile unit 10 on such coordinate system.

To monitor automatically the position of mobile unit 10, the contents of storage means 18, X counter 34, and Y counter 36 are transmitted by radio transceiver 38, upon command or interrogation, to a central station 40. Central station 40, decodes the transmitted information and files it as the location of the particular mobile unit at the time of transmission. The filed information can be used for various purposes including that of displaying vehicle locations.

It should be noted, that by deploying the remote units on streets throughout the AVL coverage area separated by predetermined distances, dead reckoning system 26 can be made to reset with known probability prior to mobile unit 10 traveling such a distance that the accumulated error in the dead reckoned position becomes unacceptable.

A preferred form of an AVL system utilizing a simplified dead reckoning system 26a and a specific deployment of remote units will be described. As noted above, heading sensor 30 generates a signal indicative of the angle between the instantaneous heading of mobile unit 10 and the original direction of passage with respect to the last passed remote unit. Switching logic 32 proportionately routes the distance increment pulses from sensor 28 to X counter 34 and Y counter 36 respectively in accordance with the cosine and sine of the heading angle. In general, heading sensor 30 must be capable of relatively fine resolution between heading angles. Switching logic 32, accordingly must also be capable of such resolution, typically involving dividing the distance increment pulses between the respective X and Y counters (34, 36) in accordance with sines and cosines having values other than unity. Such heading sensors and switching logic are relatively complex and costly.

In urban areas, however, street intersections are typically perpendicular, and fine angular resolution is thus only occasionally required. Accordingly, a preferred form of the present invention for use in such urban areas, utilizes simplified dead reckoning system 26a, which quantizes angular heading into 90° increments, with remote units specifically deployed at each non-perpendicular intersection within the AVL coverage area. Thus, dead reckoning system 26a accurately dead reckons the position of mobile unit 10 along a route in which all turns are at perpendicular intersections, and is reset and thereby shifted to a new coordinate system when a turn is made by mobile unit 10 at a non-perpendicular intersection. Thus, in accordance with one aspect of the present invention, the requirement for a relatively costly fine resolution heading sensor is avoided.

A preferred form of such a simplified dead reckoning system 26a is shown in FIG. 2. In such simplified dead reckoning system 26a, heading sensor 30 comprises: a turn sensor 50 generating output signals indicative of right and left turns, such as doppler radar sensors or a mechanical switch coupled to the steering column of the vehicle cooperating with mobile unit 10; and a two bit bidirectional counter 52, hereinafter sometimes referred to as heading register 52. Distance increment sensor 28, and X and Y counters 34 and 36 are of the same type as those same-numbered elements described in conjunction with FIG. 1. Heading register 52 and counters 34 and 36 are all reset to zero by the output signal of change-in-storage detector 20 as described above. The reference direction of heading sensor 30 is thus equal to the original direction of passage of mobile unit 10 with respect to the last passed remote unit.

Turn sensor 50 operates to increment heading register 52 in response to a turn by mobile unit 10 in, for example, a right hand direction and to decrement heading register 52 in response to left hand turns by mobile unit 10. The contents of heading register 52 thus represent the relative heading of mobile unit 10 with respect to the original direction of passage as follows:

TABLE 1

| Relative Heading (degrees) | Contents of Heading Register 52 |
|---|---|
| 0 | 00 |
| 90 | 01 |
| 180 | 10 |
| 270 | 11 |

It should be noted that when a right hand turn is made, from a prior relative heading of 270° (heading register 52 contents 11), two bit register 52 will overflow, causing the contents to be equal to 00, reflecting thereby a return of the heading of mobile unit 10 to the original direction of passage.

Switching logic 32 is receptive of signals indicative of increments of distance traveled by mobile unit 10, and operates to direct such distance increment signals to increment or decrement the respective counters 34 and 36, in accordance with the contents of heading register 52. It should be noted that confining the possible heading angles to 0°, 90°, 180° and 270° restricts the sine and cosine of the heading angle to values of zero, −1, or +1. Thus, the respective values of the sine and cosine of a given angle are either equal to zero and plus or minus one, or plus or minus one and zero. Accordingly, switching logic 32 causes the distance signals to increment or decrement counters 34 or 36 in accordance with Table 2.

TABLE 2

| Contents of Heading Register 52 | Switching Logic State |
|---|---|
| 00 | increment counter 36 |
| 01 | increment counter 34 |
| 10 | decrement counter 36 |
| 11 | decrement counter 34 |

Thus, the contents of X counter 34 are incremented or decremented in accordance with the distance traveled by mobile unit 10 in a direction parallel to the X coordinate, and the contents of Y counter 36 are incremented or decremented in accordance with the distance traveled parallel to the Y coordinate. The instantaneous contents of counters 34 and 36 therefore indicate the instantaneous position of mobile unit 10 on the coordinate system defined by the contents of storage means 18.

As noted above, dead reckoning system 26a provides accurate dead reckoning of the location of mobile unit 10 so long as mobile unit 10 makes turns only at perpendicular intersections. However, dead reckoning system 26a is not capable, in itself, of discriminating between turns at perpendicular and nonperpendicular intersections. Accordingly, dead reckoning system 26a is used in conjunction with remote units specifically deployed at each non-perpendicular intersection within the AVL coverage area. Such deployment of remote units is illustrated in FIG. 3.

Figure 3:
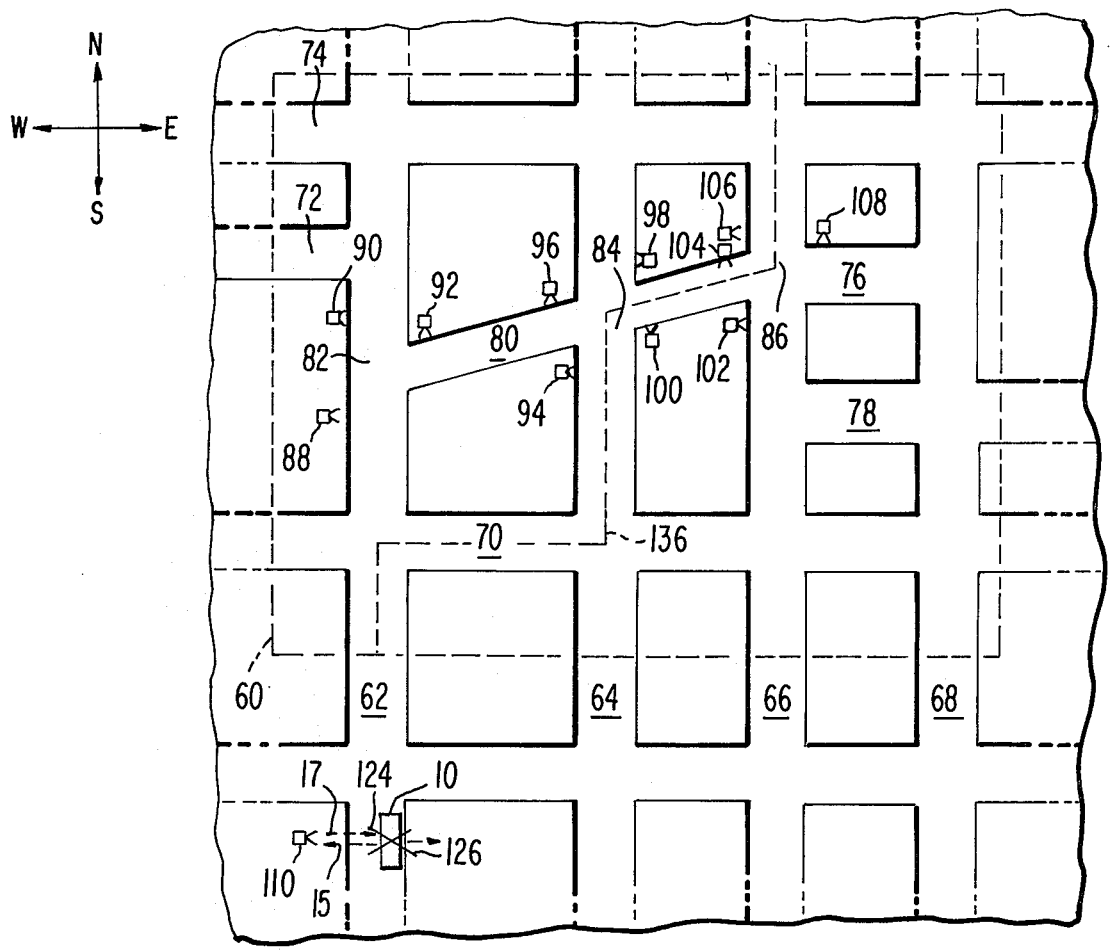
FIG. 3 is a schematic street map illustrating deployment of remote units in accordance with the present invention.

FIG. 3 is a schematic street map of a portion 60 of an AVL coverage area, including north-south running streets 62-68, east-west running streets 70-78 and skewed street 80. Remote units are deployed at each non-perpendicular intersection (82, 84, 86) within coverage area portion 60 such that dead reckoning system 26a (FIG. 2) is reset to zero whenever a mobile unit 10 makes a turn of other than 90°; 88, 90 and 92 at intersection 82; 94, 96, 98 and 100 at intersection 84; and 102, 104, 106 and 108 at intersection 86. Such a deployment of remote units allows utilization of simplified dead reckoning system 26a without introducing additional error into the AVL. Other remote units, such as remote unit 110, are positioned on the various streets in the AVL coverage at distances calculated to reset dead reckoning systems 26a prior to an unacceptable accumulation of error in dead reckoning system 26a, as mentioned above.

With reference to FIGS. 1, 2 and 3, the operation of an AVL system in accordance with the present invention utilizing simplified dead reckoning system 26a will be described, as mobile unit 10 travels along the route indicated by dotted line 136 on FIG. 3. The route indicated by line 136 is: north on street 62 to street 70, east on street 70 to street 64, north on street 64 to street 80, north-east on street 80 to street 66, then north on street 66.

As mobile unit 10 comes into the vicinity of remote unit 110, located on the western side of street 62, the identity (location) of remote unit 110 is communicated to interrogator 14 (FIG. 1). Storage means 18 is loaded accordingly. As noted above, the contents of storage means 18 identify remote unit 110 and the original direction of passage of mobile unit 10 with respect to remote 110. Assuming the new contents of register 18 to be different from the prior contents, change-in-storage detector 20 resets heading register 52 (FIG. 2) and X and Y counters 34 and 36 of dead reckoning system 26a. The reference direction and origin for dead reckoning system 26a are thus respectively established as north and the location of remote unit 110. As mobile unit 10 travels north on street 62, the contents of heading register 52 are thus 00, and Y counter 36 is incremented in accordance with the distance traveled.

When mobile unit 10 turns at street 70, turn sensor 50 generates a signal indicative of a right hand turn to increment heading register 52. The contents of register 52 are thus 01 (indicative of 90° relative heading) and as mobile unit 10 travels east on street 70, X counter 34 is incremented in accordance with the distance traveled. When mobile unit turns to street 64, turn sensor 50 generates a signal indicative of a left hand turn, to decrement thereby heading register 52. The contents of register 52 are thus again 00, indicative of mobile unit 10 again traveling in the original direction of passage (i.e.- north or 0° relative heading). Accordingly, Y counter 36 is incremented in accordance with the distance traveled as mobile unit 10 travels north on street 64.

The intersection 84 of streets 64 and 80 is non-perpendicular and accordingly, remote units 94-100 are positioned at the intersection. In turning onto street 80 from street, mobile unit 10 passes the vicinity of and communicates with remote unit 94, storage means 18 is loaded accordingly, and heading register 52, X counter 34 and Y counter 36 are reset by change in storage detector 20. However, mobile unit 10 almost immediately thereafter comes into the vicinity of remote unit 100. Mobile unit 10 then communicates with remote unit 100, storage means 18 is loaded accordingly and dead reckoning system 26a is again reset to zero. Thereafter, the position of mobile unit 10 is defined on a coordinate system having an origin established by remote unit 100 and a positive Y axis in a north-easterly direction along street 80. The contents of heading register 52 are 00 while mobile unit 10 proceeds northeast on street 80, and Y counter 36 is incremented in accordance with the distance traveled.

In turning at the non-perpendicular intersection 86, mobile unit 10 passes and communicates with remote unit 104 and subsequently with remote unit 106. Communication between mobile unit 10 and remote unit 106 thereby establishes a new coordinate system originating at intersection 86 with a positive Y axis running north on street 66.

The original direction of passage of mobile unit 10 with respect to a remote unit can be determined several ways. The original direction of passage can be established by storing a sequence of location codes in storage means 18, as described in the aforementioned copending application Ser. No. 576,604 by Kaplan and Ritzie. Alternatively, the original direction of passage can be determined by utilizing remote units which communicate different code words to mobile units approaching from opposite directions. Such remote units are described in the aforementioned U.S. Pat. No. 3,735,335 to Kaplan and Shefer. When a heading sensor 30 is a resettable compass type or inertial heading sensor, the original direction of passage may be determined by storing a digital number indicative of the instantaneous absolute heading of mobile unit 10 as it passes the remote unit. In addition, a preferred form of interrogator 14 including provisions for determining the original direction of passage of mobile unit 10 with respect to a remote unit will be described. In accordance with one aspect of the present invention, the remote units are positioned, at their respective predetermined location, on predetermined sides of the street. Information, specifying the street and side of the street where each remote unit is located is prestored in central station 40 (FIG. 1). Mobile unit 10 traveling along a given street can pass a remote unit only from one of two directions on such street. When mobile unit 10 passes a remote unit from a given direction, one side of mobile unit 10 always faces the remote unit. When passing the remote unit from the opposite direction the opposite side of mobile unit 10 faces the remote unit. Since the direction of the street and the side of such street where the remote unit is positioned are known, the direction of passage can be determined by detecting which side of mobile unit 10 faces the remote unit as mobile unit 10 passes.

Figure 4:
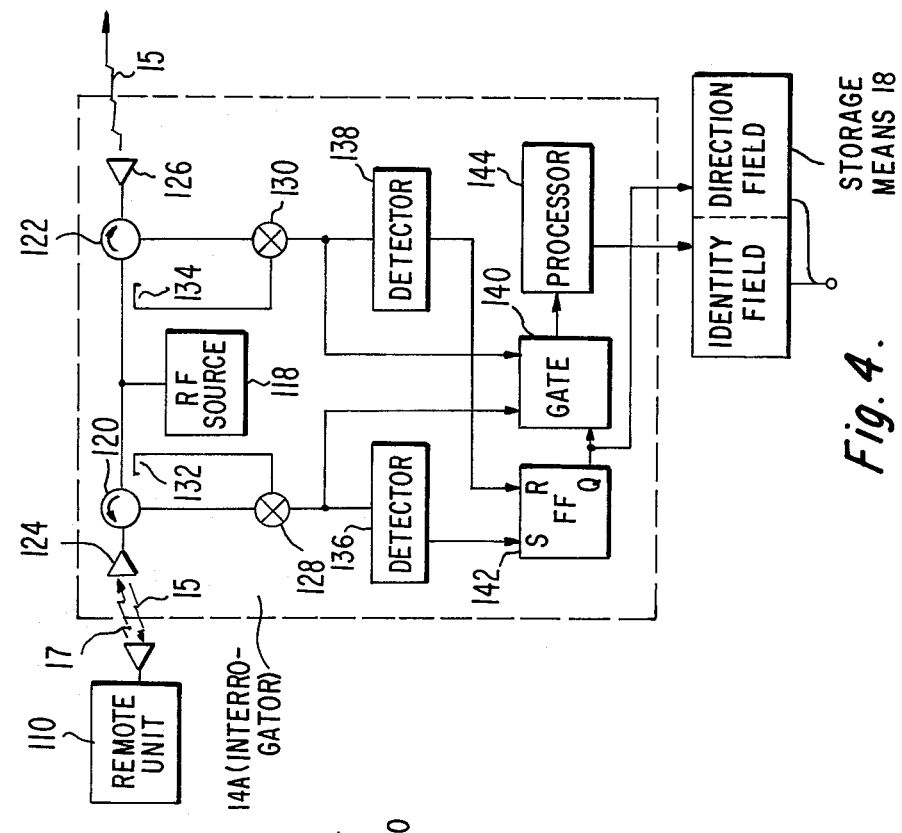
FIG. 4 is a preferred embodiment of an interrogator.

A preferred embodiment 14a of interrogator 14, including provisions to detect which side of mobile unit 10 faces a remote unit as mobile unit 10 passes is depicted in FIG. 4. Interrogator 14a includes a suitable radio frequency (RF) source 118, coupled through conventional circulators 120 and 122 to first and second antenna networks 124 and 126. Antenna networks 124 and 126 preferably comprise printed circuit corporate feed antennas such as described in U.S. Pat. No. 3,587,110, issued June 22, 1971 to O. M. Woodward. Antenna networks 120 and 122 have directional antenna patterns disposed at 180° with respect to each other and are directed to irradiate remote units positioned on the respective lateral sides of the vehicle cooperating with mobile unit 10. Circulators 120 and 122 respectively route signals received by antennas 124 and 126 to conventional mixers 128 and 130. Mixers 128 and 130 are also receptive of samples of interrogation signal 15, suitably via directional couplers 132 and 134. The output terminals of mixers 128 and 130 are coupled to suitable signal detectors 136 and 138 and to the input terminals of a suitable logic gate 140. Detectors 136 and 138 are respectively coupled to the set (S) and reset (R) terminals of a conventional RS flip flop 142, the Q output terminal of which is coupled to the control input of gate 140. The output terminal of gate 140 is coupled to the input terminal of a suitable processor 144. For a description of a suitable processor 144 reference is again made to copending application Ser. No. 576,604 by Kaplan and Ritzie.

In the operation of interrogator 14a, RF source 118 generates interrogation signal 15, which signal 15 is radiated by antennas 124 and 126. When mobile unit 10 comes into the vicinity of a remote unit 110, interrogation signal 15 illuminates the remote unit, causing the remote unit to generate reply signal 17. It should be noted that only the antenna facing the remote unit receives reply signal 17. The output signal of the mixer corresponding to the receiving antenna is indicative of the location (identity) code of the remote unit. The output signal of the mixer corresponding to the non-receiving antenna is typically zero. Detectors 136 and 138 detect which of antennas 124 or 126 receives reply signal 17 and sets or resets flip flop 142. Accordingly, the Q output signal of flip flop 142 is indicative of the antenna receiving reply signal 17; logic 1 is indicative of antenna 124, logic 0 of antenna 126. Gate 140, in accordance with the Q output signal of flip flop 142, routes the appropriate mixer output signal to processor 144.

Storage means 18 for use with integrator 14a comprises a single register, including a first field (hereinafter the "identity" field) receptive of the location code of the remote unit from processor 144 and a second 1-bit field (hereinafter the direction field) receptive of the Q output signal of flip flop 142. When the contents of storage means 18 are communicated to central station 40, the location code of the remote unit will identify the street, the position on the street and the side of the street where the remote unit is located. Thus, the original direction of passage is established by the contents of the bit representative of the antenna receiving reply signal 17. For example, assume that the identity field precedes the direction field in register 18 and the location (identity) code of remote unit 110 (FIG. 3) is binary 1000. Remote unit 110 is known to be located on north-south running street 62 (FIG. 3). When mobile unit 10 passes remote unit 110 in a northern direction, antenna 124 receives reply signal 17, flip flop 142 is accordingly set by detector 136 and gate 140 passes the output signals of mixer 128 to processor 144. The identity and direction fields of storage means 18 are thus respectively loaded with the code indicative of remote unit 110 and a logic one. Contents of 10001 in register 18 is therefore indicative of a coordinate system originating at the location of remote unit 110 with a positive Y axis in a northern direction. If mobile unit 10 passes remote unit 110 moving in a southern direction, antenna 126 will receive reply signal 17, flip flop 30 will be reset by detector 138, gate 140 will accordingly pass the output signal of mixer 130 to processor 144, and register 18 will be loaded with binary 10000. Such register 18 content (10000) is accordingly decoded as indicating a coordinate system originating at the location of remote unit 110 but with the positive Y axis in a southern direction.

Interrogator 14a as depicted in FIG. 4 is designed to cooperate with remote units such as described in the aforementioned copending application Ser. No. 576,604 by Kaplan and Ritzie. It should be appreciated, however, that interrogator 14a can be adapted to cooperate with continuously transmitting remote units. In such an arrangement, antennas 124 and 126 would be connected directly to mixers 128 and 130; RF source and circulators 120 and 122 would be omitted, and a local oscillator would be coupled to mixers 128 and 130.

It should be noted that the various interconnections between the elements of mobile unit 10 are shown in the drawing as single connectors solely for ease of illustration, and may, in fact, be plural connections.

It should be appreciated that the contents of storage means 18, and counters 34 and 36 may be displayed in mobile unit 10 by conventional means, for use as a navigational aid to a driver, in addition to or instead of being communicated to central station 40.

It should be apparent from the foregoing disclosure that the present invention provides a particularly advantageous AVL system. A minimum of digital data storage space is required. In addition, a relatively simple dead reckoning system utilizing a simple perpendicular turn sensor is provided which does not require computation of the X and Y coordinates by determination of trigonometric functions of the heading angle and multiplication by the distance signals by fractional numbers. Moreover, a minimum of communication is required between the central station and mobile units.

It will be further appreciated and understood that the embodiment of the invention described above utilizes a resettable heading sensor which provides a signal indicative of changes in heading from a varying reference heading, specifically described in the specification as the "original direction of passage." Such a heading sensor may be termed a relative heading sensor. A heading sensor which indicates a heading in an absolute sense, for example, with reference to the compass rose, without resetting capabilities and as such having a reference direction which is constant, may be used to practice the invention. In the practice of the invention utilizing absolute heading sensors, the computation of the location of the mobile unit by the computer in the central station 40 will be based on a plurality of coordinate systems, fixed with regard to the direction of the axes, in which, for example, the $x$ and $y$ axes of each of the coordinate systems will be fixed relative to the conventional compass points. Accordingly, in such case, the original direction of travel is not determined and stored in storage means 18. The origin of each of such coordinate system will be defined by the respective locations of the remote units.

What is claimed is:

1. A system for monitoring the position of a mobile unit within a predetermined area comprising:
    dead reckoning means, within said mobile unit, for generating an output signal indicative of the instantaneous location coordinates of said mobile unit on a predetermined coordinate system;
    a plurality of remote unit means, each means comprising a unit positioned at a respective predetermined location within said area, for communicating to said mobile unit information signals indicative of said respective predetermined locations as said mobile unit passes each remote unit at the respective locations;
    each of said units representing a separate coordinate system wherein the location of each of said units represents the reference coordinates for its associated coordinate system,
    storage means, in said mobile unit, receptive of said remote unit location signals, for storing thereby the information signal indicative of the location of the last communicating unit;
    resetting means, cooperating with said storage means, for generating a reset signal in response to changes in said stored information, said reset signal being applied to said dead reckoning means to reset said dead reckoning means output signal to zero, whereby said coordinate system is changed in accordance with the stored information corresponding to the last passed remote unit; and
    utilization means, receptive of said stored information signals and said dead reckoning means output signal, for determining therefrom said position of said mobile unit relative to the coordinate system of the last communicating remote unit.

2. The system of claim 1 wherein said dead reckoning means comprises:
    reference detection means for generating a direction signal indicative of the direction of travel of said mobile unit as said mobile unit passes said last communicating remote unit; said direction signal being further stored by said storage means;
    relative heading sensor means, cooperating with said reference detection means, for generating a signal indicative of the instantaneous heading of said mobile unit relative to said direction;
    odometer means, for generating a signal indicative of the distance traveled by said mobile unit from said last communicating remote unit; and
    conversion means, responsive to said distance signal, said relative heading signal and said reset signal, for resettably generating a first output signal indicative of the component in said direction of the vectorial position of said mobile unit with respect to the location of said last communicating remote unit, and a second output signal indicative of the component in a direction perpendicular to said direction of the vertical position of said mobile unit with respect to the location of said last communicating remote unit, said conversion means output signals being reset in response to changes in said stored information.

3. The system of claim 2 wherein said relative heading sensor means comprises a digital change means in heading sensor, said change means in heading sensor generating a pulse indicative of a predetermined quantum of change in heading by said mobile unit and
    a counter, responsive to said change in heading pulses and said reset signal, for generating a heading count indicative of cumulative changes in heading of said mobile unit since said counter was last reset, said counter being reset in response to changes in said stored information.

4. The system of claim 3 wherein said predetermined quantum of change is 90°.

5. The system of claim 3 wherein said predetermined area contains a plurality of intersecting drivable surfaces, said remote units are respectively positioned proximate to said drivable surfaces to communicate thereby with said mobile unit as said mobile unit passes said remote unit on said drivable surfaces, and a remote unit is positioned at each substantially non-perpendicular intersection of said drivable surfaces, wherein further:
    said dead reckoning means comprises:
    a turn sensor, coupled to said mobile unit, for generating output signals respectively indicative of perpendicular turns in left and right hand directions by said mobile unit; and
    heading register means, responsive to said turn sensor output signals, for generating a two bit binary count indicative of changes in the heading of said mobile unit in increments of 90°, said count being incremented in response to each turn in one of said directions, decremented in response to each turn in the other of said directions; and
    said conversion means comprises:
    first and second counters, and
    gating means, responsive to said binary heading count and said distance signal, for selectively incrementing or decrementing the contents of said first and second counters in accordance with said heading count and said distance signal, whereby the contents of said first register is representative of the position of said mobile unit from said stored location in said original direction and the contents of said second register are representative of the position of said mobile unit from said stored location in a direction perpendicular to said original direction;

said heading register means, and said first and second counters being responsive to said reset signal and reset in response to each change in said stored information.

6. The system of claim 5, wherein said mobile unit is coupled to a vehicle having longitudinal and transverse axes, and said reference detection means comprises:

a first antenna having a radiation pattern disposed to communicate with remote units positioned on one transverse side of said vehicle;

a second antenna having a radiation pattern disposed to communicate with remote units positioned on a second transverse side of said vehicle, said second side being opposite said first side; and detector means, coupled to said first and second antennas, for generating a signal indicative of which said first and second antennas communicate with said remote unit, said detector means signal being indicative of said direction, and applied to said storage means.

7. The system of claim 1, wherein:

said dead reckoning means comprises:

absolute heading sensor means for producing an output signal indicative of the heading of said mobile unit with respect to a fixed reference direction;

odometer means, for generating a signal indicative of the distance traveled by said mobile unit;

conversion means, responsive to said heading signals, signals, said distance signals and said reset signal, for resettably generating a first output signal indicative of the component of the vectorial position of said mobile unit with respect to the location of said stored location in said reference direction and a second output signal indicative of the component of the vectorial location of said mobile unit with respect to said stored location in a direction perpendicular to said reference direction; said conversion means output signals being reset in response to changes in said stored location.

8. A method for monitoring the position of a mobile unit within a predetermined area comprising the steps of:

(a) positioning a plurality of remote units at predetermined locations within said area for communicating information indicative of the respective locations of said remote units when said mobile unit comes within the vicinity of said respective remote units;

(b) receiving and storing within said mobile unit information indicative of the predetermined location of a first remote unit when said mobile unit comes into the vicinity of said first remote unit;

(c) dead reckoning the instantaneous location coordinates of said mobile unit from said stored predetermined location; whereby the instantaneous position of said mobile unit within said area is defined by said stored predetermined location and said dead reckoned location coordinates;

(d) when said mobile unit comes into the vicinity of a second remote unit, receiving information indicative of the predetermined location of said second remote unit and replacing in storage said first remote unit location information with said second remote unit location information;

(e) detecting the condition when said second remote unit location information is different from said first remote unit location information; and (f) upon detection of said condition, resetting said dead reckoned instantaneous location coordinates to zero.

9. The method of claim 8, further including the step of:

(g) generating and storing information indicative of the initial direction of travel of said mobile unit with respect to said respective remote units at the time said mobile unit comes into the vicinity of said respective remote units; and wherein said dead reckoning step (c) comprises the steps of:

(h) generating a signal indicative of the heading of said mobile unit with respect to said initial direction of travel;

(i) generating a signal indicative of increments of distance traveled by said mobile unit;

(j) generating, from said heading signal and said distance signal, first and second signals respectively indicative of the component of the instantaneous vectorial location of said mobile unit with respect to said stored location in a direction substantially parallel to said initial direction and of the component of the vectorial location of said mobile unit with respect to said stored location in a direction substantially perpendicular to said initial direction.

10. The method of claim 9 for a predetermined area containing intersecting drivable surfaces, wherein said positioning step (a) includes the following step of:

(k) positioning a remote unit at each non-perpendicular intersection of said drivable surfaces; and wherein further:

said generation of a heading signal step (h) includes the steps of:

(l) generating signals respectively indicative of perpendicular turns by said mobile unit in right and left directions; and (m) incrementing and decrementing a resettable two-bit bidirectional counter in response to said turn signals to generate said heading signal.

* * * * *